United States Patent [19]

Yanagisawa

[11] Patent Number: 4,995,277

[45] Date of Patent: Feb. 26, 1991

[54] TWO DIMENSIONAL DRIVE SYSTEM

[76] Inventor: Ken Yanagisawa, c/o, Kabushiki Kaisha Mechanic Sekkei Jimusho, 5175-1, Ooaza Toyoshina, Toyoshina-machi, Minamiazumi-gun, Nagano-ken, Japan

[21] Appl. No.: 350,238

[22] Filed: May 11, 1989

[30] Foreign Application Priority Data

May 31, 1988 [JP] Japan .............................. 63-134209
May 31, 1988 [JP] Japan .............................. 63-134210

[51] Int. Cl.$^5$ .......................................... F16H 19/02
[52] U.S. Cl. ................................... 74/89.15; 33/1 M; 74/471 X Y; 74/479; 248/657
[58] Field of Search .............. 74/89.15, 471 X Y, 479; 108/143; 248/656, 657; 901/16; 33/1 M

[56] References Cited

U.S. PATENT DOCUMENTS

| | | | |
|---|---|---|---|
| 1,985,265 | 12/1934 | Smith | 33/1 M |
| 2,847,859 | 8/1958 | Lynott | 33/1 M |
| 2,857,032 | 10/1958 | Johnson et al. | 33/1 M |
| 3,155,383 | 11/1964 | Whitmore | 108/143 |
| 3,422,538 | 1/1969 | Panissidi | 33/1 M |
| 3,628,497 | 12/1971 | Neu | 33/1 M |
| 3,764,900 | 10/1973 | Baldwin | 33/1 M |
| 4,006,645 | 2/1977 | Newell | 74/479 |
| 4,171,657 | 10/1979 | Halberschmidt et al. | 33/1 M |
| 4,729,536 | 3/1988 | Scala | 74/479 |

FOREIGN PATENT DOCUMENTS

| | | | |
|---|---|---|---|
| 265855 | 5/1988 | European Pat. Off. | 901/16 |
| 2646534 | 4/1978 | Fed. Rep. of Germany | 33/1 M |
| 3628202 | 2/1988 | Fed. Rep. of Germany | 33/1 M |
| 63-191533 | 8/1988 | Japan | 33/1 M |

*Primary Examiner*—Leslie A. Braun
*Assistant Examiner*—Scott Anchell

[57] ABSTRACT

A slider travels on a first rod and a second rod. Both ends of the first rod are respectively connected to two first travellers which are capable of travelling along first guides arranged in parallel. Both ends of the second rod are respectively connected to two second travellers which are capable of travelling along second guides which are arranged in parallel and perpendicularly arranged to the first guides. The first rod moves the slider in a first direction with its travelling driven by a first drive. The second rod moves the slider in a second direction perpendicular to the first direction with its travelling driven by a second drive. The movement in the first and the second directions makes two dimensional movement of the slider possible.

18 Claims, 7 Drawing Sheets

4,995,277

TWO DIMENSIONAL DRIVE SYSTEM

FIELD OF THE INVENTION AND RELATED ART STATEMENT

The present invention relates to a two dimensional drive system, more specifically relates to a two dimensional drive system having a slider capable of the two dimensional movement for carrying works, tools, etc. attached thereon to prescribed position.

There was disclosed a conventional two dimensional drive system, which defines the position of works or tools etc. attached on a driven body, in the Japanese Provisional Publication (Kokai) Gazzete No. 53-36869. The system was a drive system for a working table, and it has a first slider which is moved in a first direction by first drive means, and a second slider which is provided on the first slider and moved in a second direction perpendicular to the first direction by second drive means. Works machined or tools, etc. are attached on the second slider, so that they can be moved in a plane and positioned therein.

However, there are disadvantages in the above noted conventional second dimensional drive system. The second drive means and the second slider are provided on the first slider, so that torque required of the first drive means should be larger than torque required of the second drive means. The torque will differ according to the direction of the movement of the second slider, so that it is difficult to control high speed movement or high speed positioning of the second slider. Moreover, weight loading to the first or second drive means differs according to the direction of the movement, so vibration is apt to generated in the system.

OBJECTS AND SUMMARY OF THE INVENTION

The object of the present invention is to overcome the above stated disadvantages and to provide a two dimensional drive system which is capable of driving a slider stably at high speed.

Another object of the present invention is to provide a two dimensional drive system having high precision of defining the position of the slider.

Another object of the present invention is to provide a two dimensional drive system capable of wide use, which can be adapted many kinds of slider.

And other object of the present invention is to provide a two dimensional drive system which can rotate works or tools, etc. on the slider.

In the two dimensional drive system of the present invention, the position of the slider is defined by the position of first travellers to which each end of a first rod is respectively connected and the position of second travellers to which each end of a second rod is respectively connected. In moving the slider, the weight loading to the first travellers and the weight loading to the second travellers are always same, so it is possible to move the slider stably and precisely at high speed. The first and the second rods are detachably connected to the first travellers or the second travellers by connecting means, so that many kinds of slider can be adapted to the system. Moreover, if a rotor is provided to the slider, works or tools, etc. on the slider can be rotated and defined positioned with the movement of the slider and the rotation of the rotor.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Preferred embodiments of the present invention will now be described.

FIRST EMBODIMENT

Figure 1:
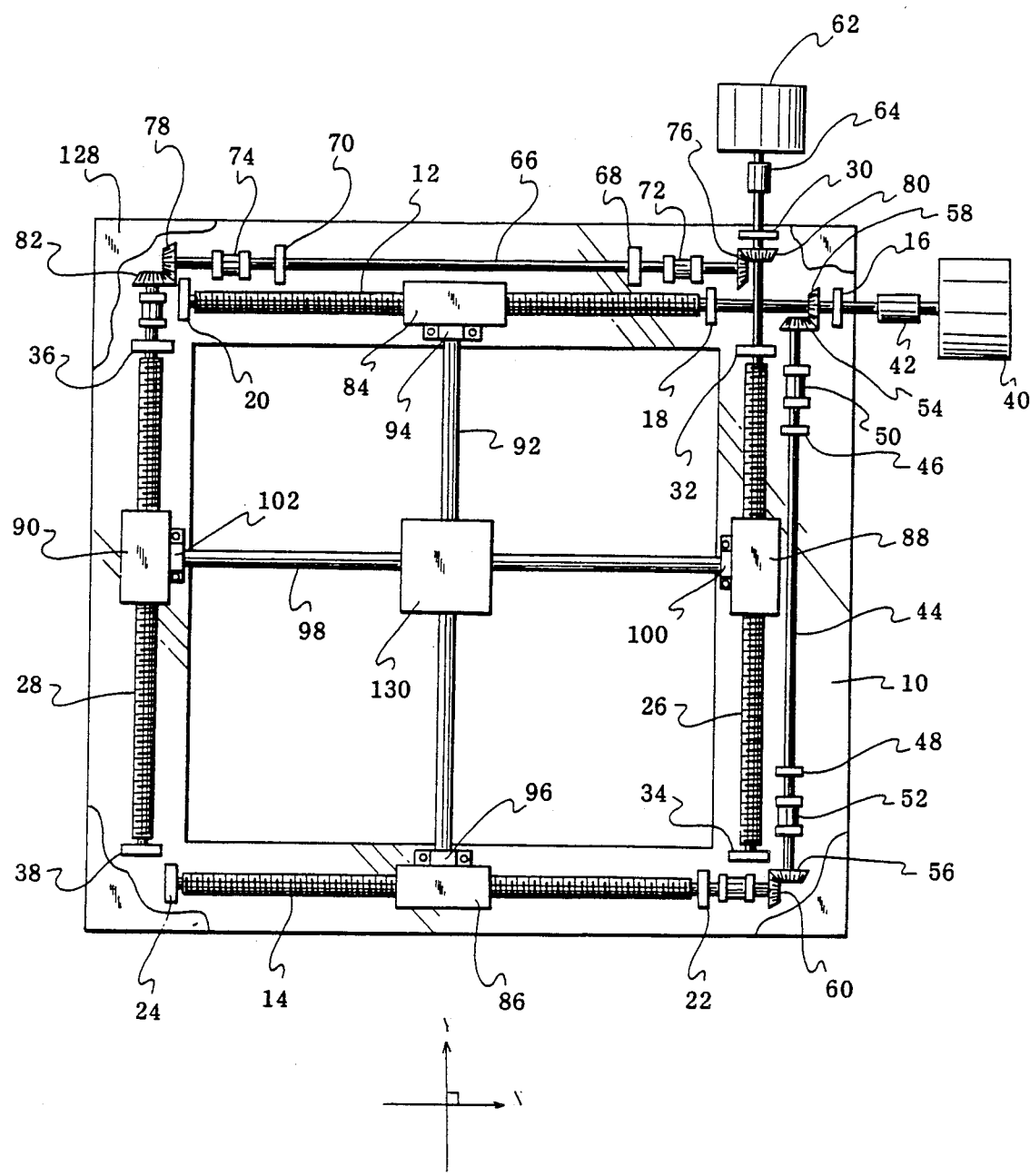
FIG. 1 shows a plan view of first embodiment of a second dimensional drive system of the present invention.

First, the structure of first embodiment is explained with reference to FIG. 1.

A frame 10 is formed as a rectangle and whose center part is hollow.

First ball bearing screws 12 and 14 as an example of first guide means are mutually arranged in parallel in the direction of an X-axis as a first direction in a common horizontal plane. The first ball bearing screw 12 is rotatably supported by supporting pieces 16, 18 and 20 on the frame 10. The first ball bearing screw 14 is rotatably supported by supporting pieces 22 and 24 on the frame 10.

Second ball bearing screws 26 and 28 as an example of second guide means are mutually arranged in parallel in the direction of a Y-axis as a second direction, which is perpendicular to the first direction, in a common horizontal plane. The second ball bearing screw 26 is rotatably supported by supporting pieces 30, 32 and 34 on the frame 10. The second ball bearing screw 28 is rotatably supported by supporting pieces 36 and 38 on the frame 10.

A first motor 40 as an example of first drive means is fixed to the frame 10 by fixing means (not shown). The first motor 40 and the first ball bearing screw 12 are connected by a coupler 42, so that the torque of the first motor 40 is directly transmitted to the first ball bearing screw 12. To the first ball bearing screw 14, the torque of the first motor 40 is transmitted by a first shaft 44 as an example of a first transmitter. The first shaft 44 is rotatably supported by supporting pieces 46 and 48 on the frame 10. There are fixed bevel gears (which can be spiral bevel gears) 54 and 56 end joined to opposite ends of the first shaft 44 by couplers 50 and 52. Bevel gears 54 and 56 mesh, respectively, with bevel gears 58 and 60 which are fixed to the first ball bearing screws 12 and 14. Both of the first ball bearing screws 12 and 14 are coupled for synchronous rotation at same speed and in same reaction by the first transmitter. With the first transmitter, single first motor 40 can rotate two first ball bearing screws 12 and 14.

A second motor 62 as an example of second drive means is fixed to the frame 10 by fixing means (not shown). The second motor 62 and the second ball bearing screw 26 are connected by a coupler 64, so that the torque of the second motor 62 is directly transmitted to the second ball bearing screw 26. To the second ball bearing screw 28, the torque of the second motor 62 is transmitted by a second shaft 66 as an example of a second transmitter. The second shaft 66 is rotatably supported by supporting pieces 68 and 70 on the frame 10. There are fixed bevel gears 76 and 78 at each end of the second shaft 66 by couplers 72 and 74. Each of bevel gears 76 and 78 meshes with each of bevel gears 80 and 82 which is fixed to the second ball bearing screw 26 or 28. Both of the second ball bearing screws 26 and 28 are capable of synchronous rotation at same speed and in same direction by the second transmitter. With the second transmitter, single second motor 62 can rotate two second ball bearing screws 26 and 28.

First travellers 84 and 86 are respectively screwed on the first ball bearing screws 12 and 14. The first travellers 84 and 86 travel at same speed and in a same direction along the X-axis with synchronous rotation of the first ball bearing screws 12 and 14.

Second travellers 88 and 90 are respectively screwed on the second ball bearing screws 26 and 28. The second travellers 88 and 90 travel at same speed and in a same direction along the Y-axis with synchronous rotation of the second ball bearing screws 26 and 28.

Each end of a first rod 92 is respectively connected to the first travellers 84 and 86 by connecting means 94 and 96. The first rod 92 is always parallel to the second ball bearing screws 26 and 28. By connecting the first rod 92 to the first travellers 84 and 86, rotation of the first travellers 84 and 86 is prevented by the first rod 92 when the first ball bearing screws 12 and 14 are rotated. Therefore, the first travellers 84 and 86 and the first rod 92 are able to travel in the direction of the X-axis upon rotation of the first ball bearing screws 12 and 14.

Each end of a second rod 98 is respectively connected to the second travellers 88 and 90 by connecting means 100 and 102. The second rod 98 is always parallel to the first ball bearing screws 12 and 14. By connecting the second rod 98 to the second travellers 88 and 90, rotation of the second travellers 88 and 90 is prevented by the first rod 98 when second ball bearing screws 26 and 28 are rotated. Therefore, the second travellers 88 and 90 and the second rod 98 are able to travel in the direction of the Y-axis upon rotation of the second ball bearing screws 26 and 28.

Figure 2:
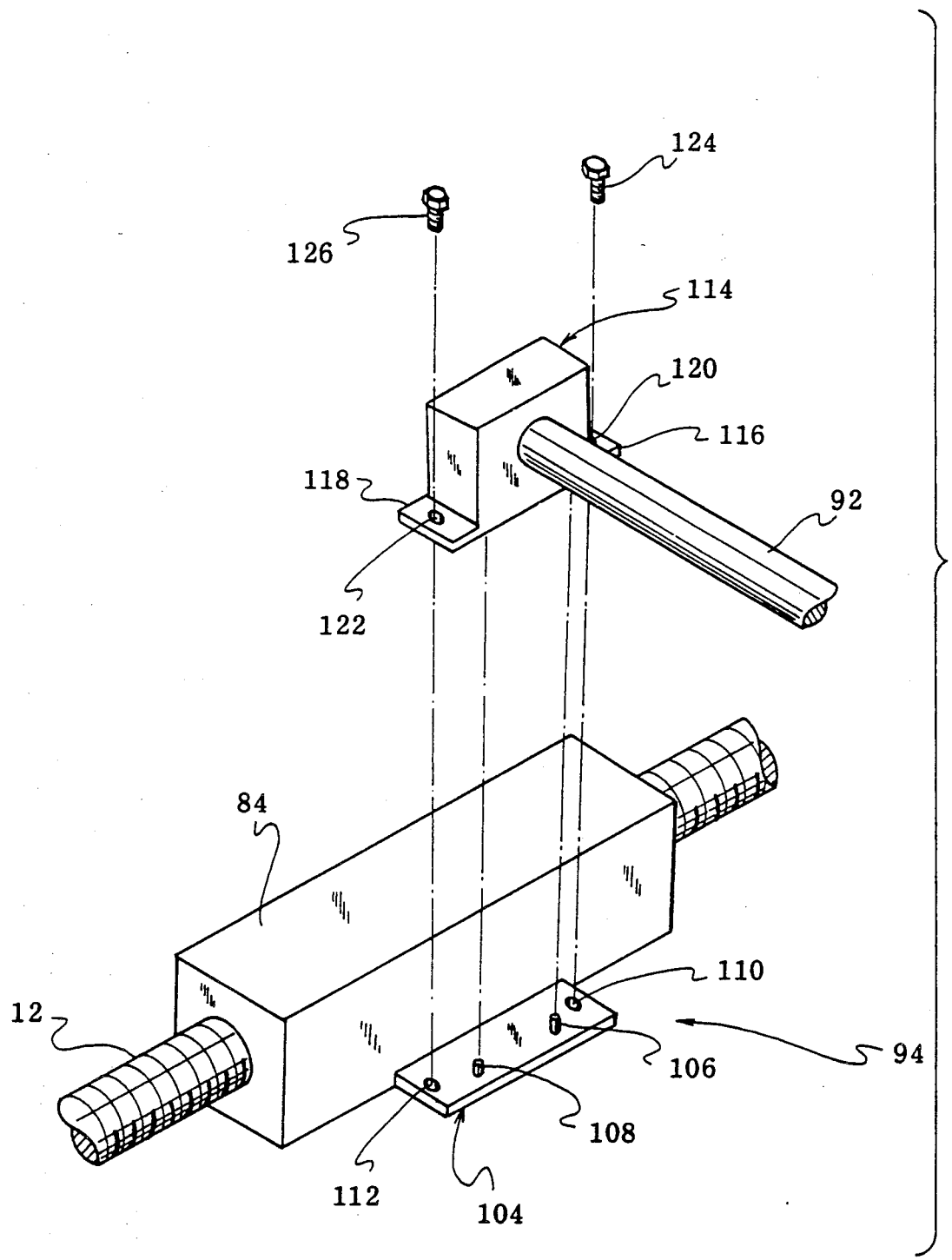
FIG. 2 shows a perspective view of connecting means of FIG. 1.
Figure 3:
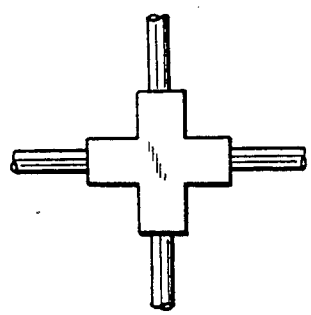
FIGS. 3-10 show plan views of other examples of sliders.
Figure 4:
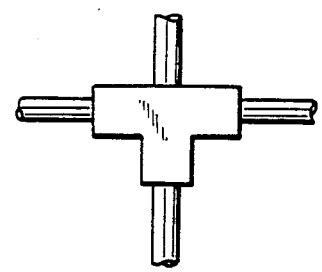
Figure 5:
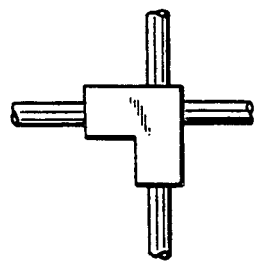
Figure 6:
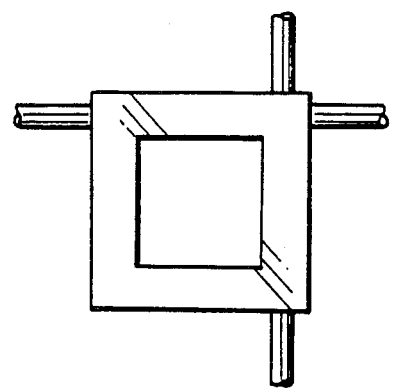
Figure 7:
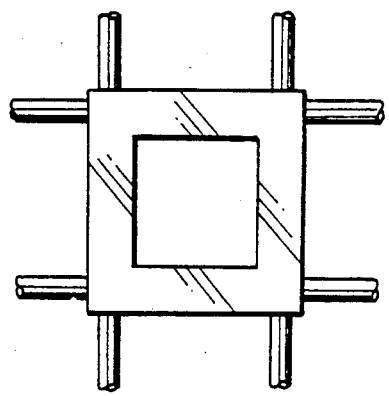
Figure 8:
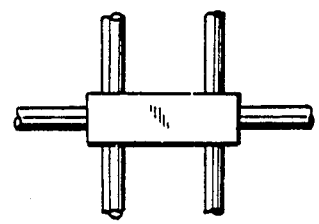
Figure 9:
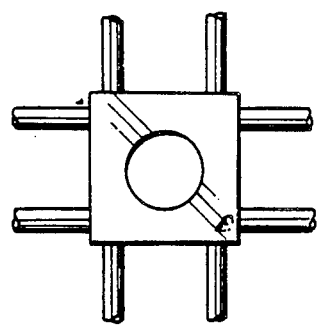
Figure 10:
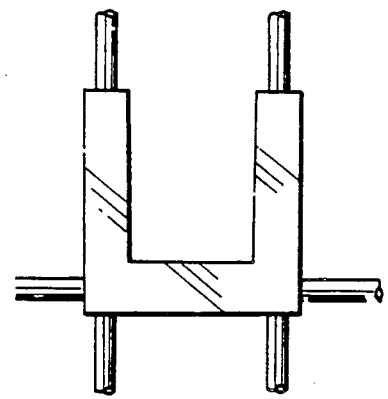

The first rod 92 and the second rod 98 are respectively connected to the first travellers 84 and 86 or the second travellers 88 and 90 by connecting means 94, 96, 100 and 102. The connecting means are described by referring to the connecting means 94 as an example. The connecting means 94 is shown in FIG. 2. In FIG. 2, an extended section 104 is horizontally extended from the lower section of the first traveller 84. Two positioning pins 106 and 108 are vertically provided on the upper face of the extended section 104. Two female-screw-holes 110 and 112 are bored in the extended section 104. A connecting section 114 is fixed to the end section of the first rod 92. There are bored two positioning holes (not shown), which can be fitted with the positioning pins 106 and 108, on the bottom face of the connecting section 114. There are bored through-holes 120 and 122 in the flanges 116 and 118 of the connecting section 114. The positions of the through-holes 120 and 122 correspond to the female-screw-holes 110 and 112. The connecting section 114 is attached to the extended section 104 by fitting the positioning holes of the connecting section 114 over and the positioning pins 106 and 108 of the extended section, inserting bolts 124 and 126 through the through-holes 120 and 122 and screwing them into the female-screw holes 110 and 112, so that the first rod 92 is tightly connected to the first traveller 84. The positioning pins 106 and 108 and the positioning holes can be omitted because the connecting section 114 is fixed at prescribed position on the extended section 104 by the bolts 124 and 126, but it is desirable to provide such positioning means as positioning pins and positioning holes, etc. for quick positioning. Note that, in case of connecting the connecting section 114 to the extended section 104 by clamping them, for example, the positioning means should be provided therebetween. The first ball bearing screws 12 and 14 and the second ball bearing screws 26 and 28 are covered over with a cover 128 (see FIG. 1), so the extended section 104 is projected toward the inner space of the frame 10 from the slot (not shown) of the cover 128. To detach the first rod 92 from the first traveller 84, the connecting section 114 can be easily separated from the extended section 104 by unscrewing the bolts 124 and 126 from the extended section 104. The structure of other connecting means 96, 100 and 102 are the same as the connecting means 94, so a description of them is omitted.

In FIG. 1 again, the first rod 92 and the second rod 98 pass through and perpendicularly cross in a slider 130. The slider 130 is able to move on the first rod 92 and the second rod 98, it moves in the direction of the X-axis with the movement of the first rod 92 in the direction thereof, and moves in the direction of the Y-axis with the movement of the second rod 98 in the direction thereof. Therefore, the position of the X-Y direction is defined by the movement of the first travellers 84 and 86 and the second travellers 88 and 90. Works (not shown), tools (not shown) or heads of machining robots (not shown), etc. can be attached on the slider 130, so that positioning of them and machining works can be executed in the hollow space of the frame 10. The slider 130 shown in FIG. 1 is a block type slider. Other types of sliders which are shown, for example, in FIGS. 3–6 also can be adapted. The connecting means made it possible to interchange sliders, and the drive system can be used widely.

Other shapes of sliders will be explained. The drive system is able to adapt sliders shown FIGS. 7-10. Sliders of the examples have two first rods and/or two second rods passed therethrough, so connecting means which is different from one shown in FIG. 2 is adapted. The example of connecting means for sliders shown in FIGS. 7-10 is explained with reference to FIG. 11. The connecting means is attached to the first traveller 84 in FIG. 1. The connecting section 132, which is different from one shown in FIG. 2, is elongated in the direction of the X-axis and is fixed at both end sections of two first rods 134 and 136 arranged in parallel. There are bored positioning holes (not shown), which can be fitted with the positioning pins 106 and 108, on the bottom face of the connecting section 132. There are bored through holes 138 and 140, which are corresponding to the female-screw-holes 110 and 112, in the connecting section 132. The connecting section 132 can be detachably attached to the extended section 104 by bolts 142 and 144.

Next, the action of the drive system of first embodiment will be explained with reference to FIG. 1. When the first motor 40 rotates, the first ball bearing screws 12 and 14 are rotated in same direction at same speed, and the first travellers 84 and 86 synchronously move in the direction of the X-axis. With the movement, the first rod 92 is also moved in the direction of the X-axis, so that the slider 130 moves in the direction thereof.

Second ball bearing screws 26 and 28 are rotated in same direction at same speed when the second motor 62 rotates, and the second travellers 88 and 90 synchronously move in the direction of the Y-axis. With the movement, the second rod 98 is also moved in the direction of the Y-axis, so that the slider moves in the direction thereof. Therefore, the position of the slider 130 in a plane is defined by the movement of the slider 130 in the X- and Y- directions. Positioning of the slider 130 is controlled by a control unit (not shown) with a built-in micro computer which controls the rotation speed, rotational directions, etc. of the first and second motors 40 and 62.

With the sliders shown in FIGS. 1 and 3-10, when a work is, first, mounted on the slider and then some parts are arranged on the work, directions of the arrangement of the parts are limited to the X- and Y- axes. So it is very difficult to control the radial arrangement of the parts, and the control program for the control unit should be very intricate.

Figure 12:
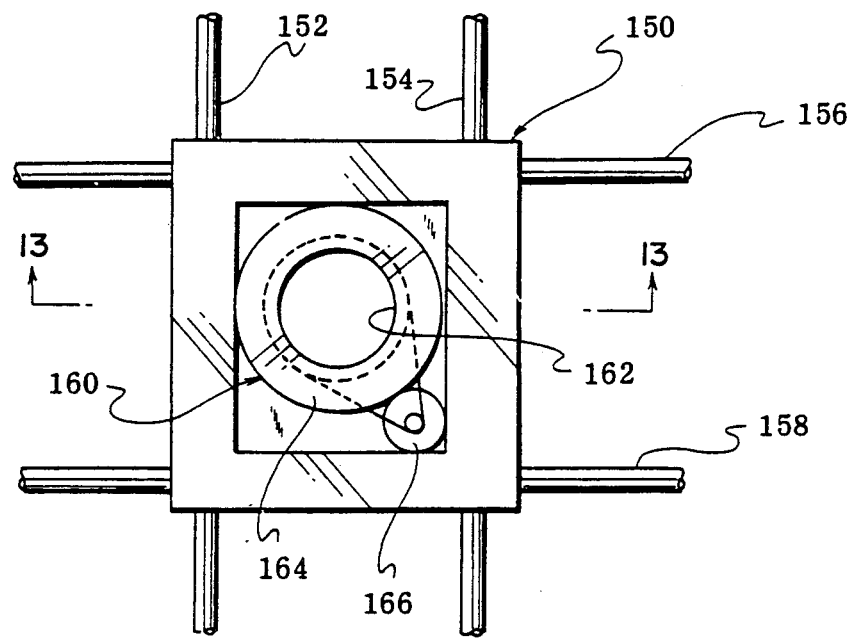
FIG. 12 shows a plan view of a slider with a rotor.
Figure 13:
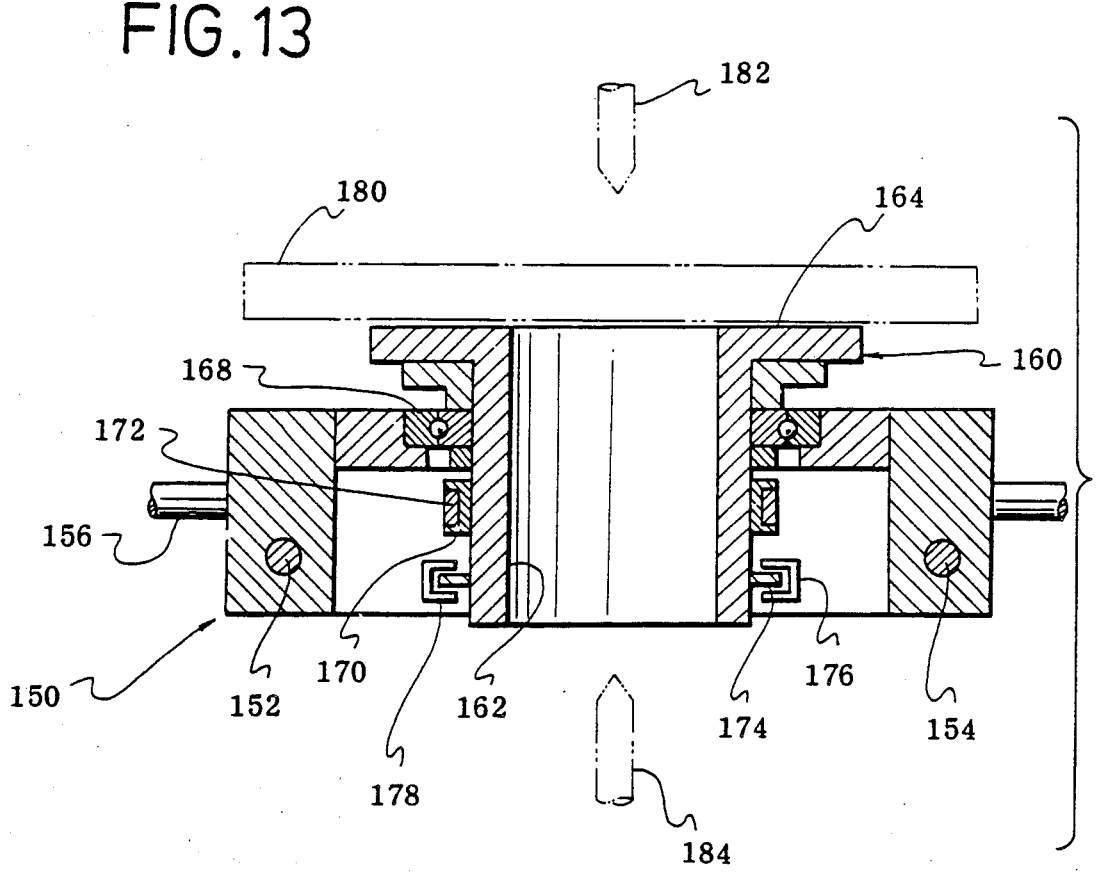
FIG. 13 shows a sectional view of the slider of FIG. 12 taken along the line 13—13.

However, a slider 150 of FIG. 12 can be applied. First rods 152 and 154 and second rods 156 and 158 are passed through each edge sections of the slider 150, and the slider 150 is able to move on the first rods 152 and 154 and the second rods 156 and 158. A rotor 160 is rotatably attached to the slider 150. The rotor 160 is of cylindrical shape with a through-hole 162 and carries a flange section 164 for mounting works, etc. at the upper section thereof. The rotor 160 is rotated by a third motor 166 as an example of third drive means which is mounted in the slider 150. The rotation of the third motor 166 is also controlled by the control unit (not shown) with a built-in micro computer. The sectional view of slider 150 taken along the line 13—13 of FIG. 12 is shown in FIG. 13. As shown in FIG. 13, a bearing 168 is provided between the slider 150 and the rotor 160, and a timing belt 172 which transmits the torque of the third motor 166 to the rotor 160 is engaged to the third motor 166 and a pulley 170 which is fixed over the outer face of the rotor 160. Therefore, the torque of the third motor 166 is transmitted to the rotor 160 and the rotation speed, the rotational direction, the rotational angle, etc. of the rotor 160 are defined by the rotation of the third motor 166. Note that, a brake disk 174 is fixed on the outer face of the rotor 160. When the brake disk 174 is clamped with brake units 176 and 178 which are controlled by the control unit, the rotor can be stopped from rotating. In this slider 150, a work 180 is mounted on the flange section 164 of the rotor 160 and parts are put on the work 180 with the rotation of the rotor 160 through an arc of prescribed angle, so that the parts can be radially arranged on the work 180. If the rotor is continuously rotated, it is possible to rotate the work in a plane. The rotor 160 is not requied to be cylindrical shape, so other shapes such as a turn table, etc. can be adapted as the rotor. And gears, an endless wire, a chain, etc. can be adapted as means for transmitting the torque of the third motor 166 to the rotor 160. Moreover, the rotor 160 may have a motor structure to rotate itself. In FIGS. 12 and 13, the rotor 160 has a hollow cylindrical shape, so the work can be machined by tools 182 and 184 from upper and lower sides, and the machining from the both sides can be also executed when the slider shown in FIGS. 6, 7, 9 or 10 is adapted.

In the first embodiment, the single first motor 40 and the single second motor 62 are used as the first and second drive means but two synchronized motors can be used as the first and the second drive means without the first and the second transmitters. And a chain transmitting mechanism, a belt transmitting mechanism, etc. can be used as the first and the second transmitters.

SECOND EMBODIMENT

Figure 14:
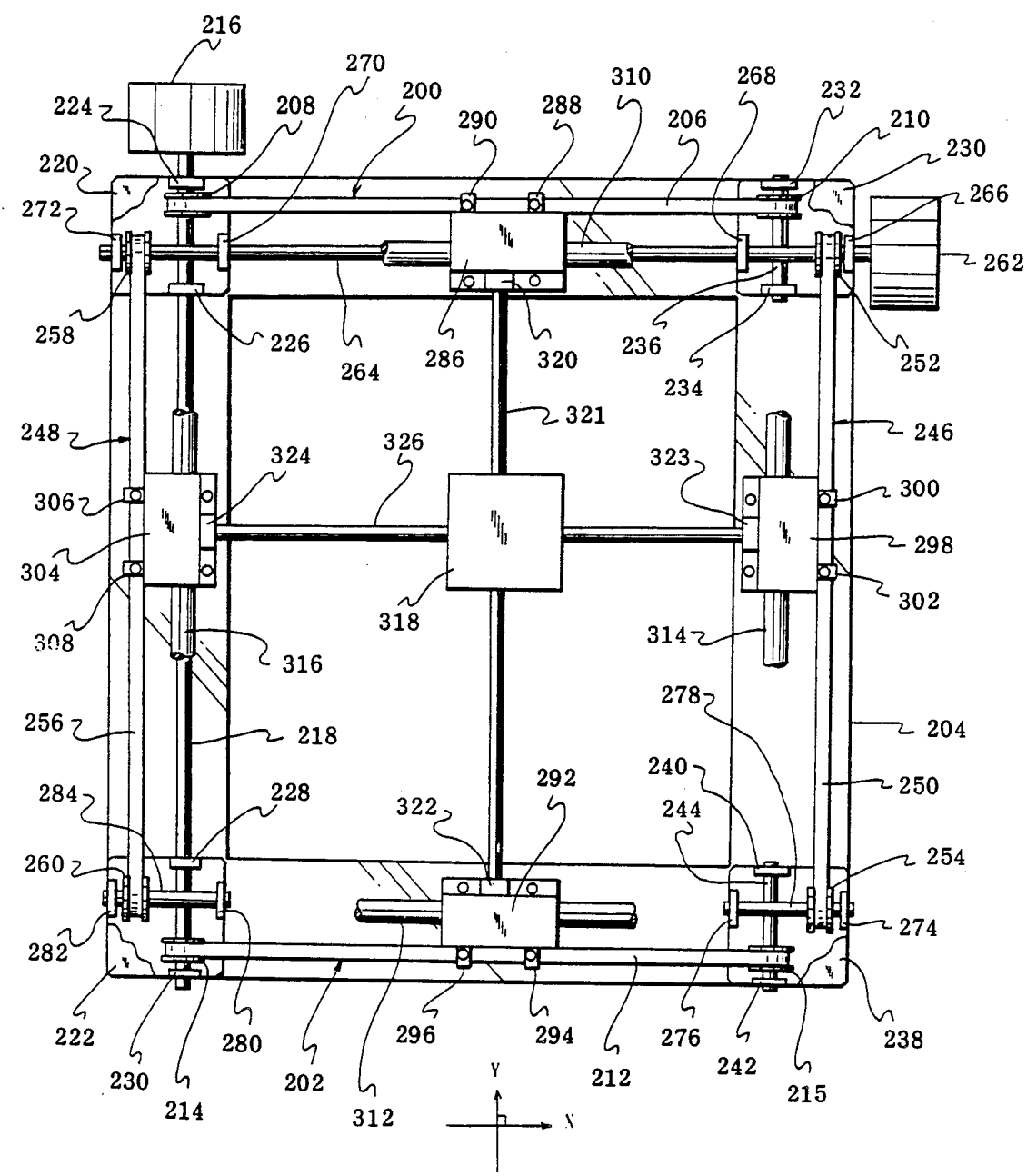
FIG. 14 shows a plan view of a second embodiment.

Next, a second embodiment will now be described with reference to FIG. 14.

First belt drive mechanisms 200 and 202 as an example of first drive means are arranged in parallel on a frame 204. A timing belt 206 of the first belt drive mechanism 200 is engaged to pulleys 208 and 210. A timing belt 212 of the first belt drive mechanism 202 is engaged to pulleys 214 and 215. The pulleys 208 and 214 are coaxially fixed on an elongated shaft 218 which is rotated by single first motor 216 as an example of first drive means. The shaft 218 is rotatably supported by supporting pieces 224, 226, 228 and 230 which are fixed in a gear box 220 or 222. The pulley 210 is coaxially fixed on a shaft 236 which is rotatably supported by supporting pieces 232 and 234 which are fixed in a gear box 230. The pulley 215 is coaxially fixed on a shaft 244 which is rotatably supported by supporting pieces 240 and 242 which are fixed in a gear box 238.

The first motor 216 is fixed to the frame 204 by fixing means (not shown).

Second belt drive mechanisms 246 and 248 as an example of second drive means are arranged in parallel and perpendicular to the first belt drive mechanisms 200 and 202 on the frame 204. A timing belt 250 of the second belt drive mechanism 246 is engaged to pulleys 252 and 254. A timing belt 256 of the second belt drive mechanism 248 is engaged to pulleys 258 and 260. The pulleys 252 and 258 are coaxially fixed on an elongated shaft 264 which is rotated by single second motor 262 as an example of second drive means. The shaft 264 is rotatably supported by supporting pieces 266, 268, 270 and 272 which are fixed in the gear box 230 or 220. The pulley 254 is coaxially fixed on a shaft 278 which is rotatably supported by supporting pieces 274 and 276 which are fixed in the gear box 238. The pulley 260 is coaxially fixed on a shaft 284 which is rotatably supported by supporting pieces 280 and 282 which are fixed in the gear box 222. The second motor 262 is fixed to the frame 204 by fixing means (not shown).

A first traveller 286 is connected to the timing belt 206 by connectors 288 and 290. A first traveller 292 is connected to the timing belt 212 by connectors 294 and 296. When the first motor 216 is driven, the timing belts 206 and 212 are driven in same direction at same speed, so that the first travellers 286 and 292 synchronously move in the direction of an X-axis as a first direction. A second traveller 298 is connected to the timing belt 250 by connectors 300 and 302. A second traveller 304 is connected to the timing belt 256 by connectors 306 and 308. When the second motor 262 is driven, the timing belts 250 and 256 are driven in same direction at same speed, so that the second travellers 298 and 304 synchronously move in the direction of a Y-axis as a second direction which is perpendicular to the first direction.

First linear guides 310 and 312 are rods which are respectively passed through the first traveller 286 or 292. Each end of the first linear guide 310 is fixed to the gear box 220 or 230, and each end of the first linear guide 312 is fixed to the gear box 222 or 238. Each of the first travellers 286 and 292 can move on the first linear guide 310 or 312 in the direction of the X-axis.

Second linear guides 314 and 316 are rods which are respectively passed through the second traveller 298 or 304. Each end of the second linear guide 314 is fixed to the gear box 230 or 238, and each end of the second linear guide 316 is fixed to the gear box 220 or 222. Each of the second travellers 298 and 304 can be travelled on the second linear guide 314 or 316 in the direction of the Y-axis. The reason why the first linear guides 310 and 314 and the second linear guides 314 and 316 are provided is that it is very difficult to guide the first travellers 286 and 292 and the second travellers 298 and 304 stably in the direction of the X- or Y- direction by the timing belts 206, 212, 250 and 256 only. Note that, the first linear guides and the second linear guides are not limited to the rods shown, they may be any means which are able to guide the first travellers and the second travellers linearly.

Figure 11:
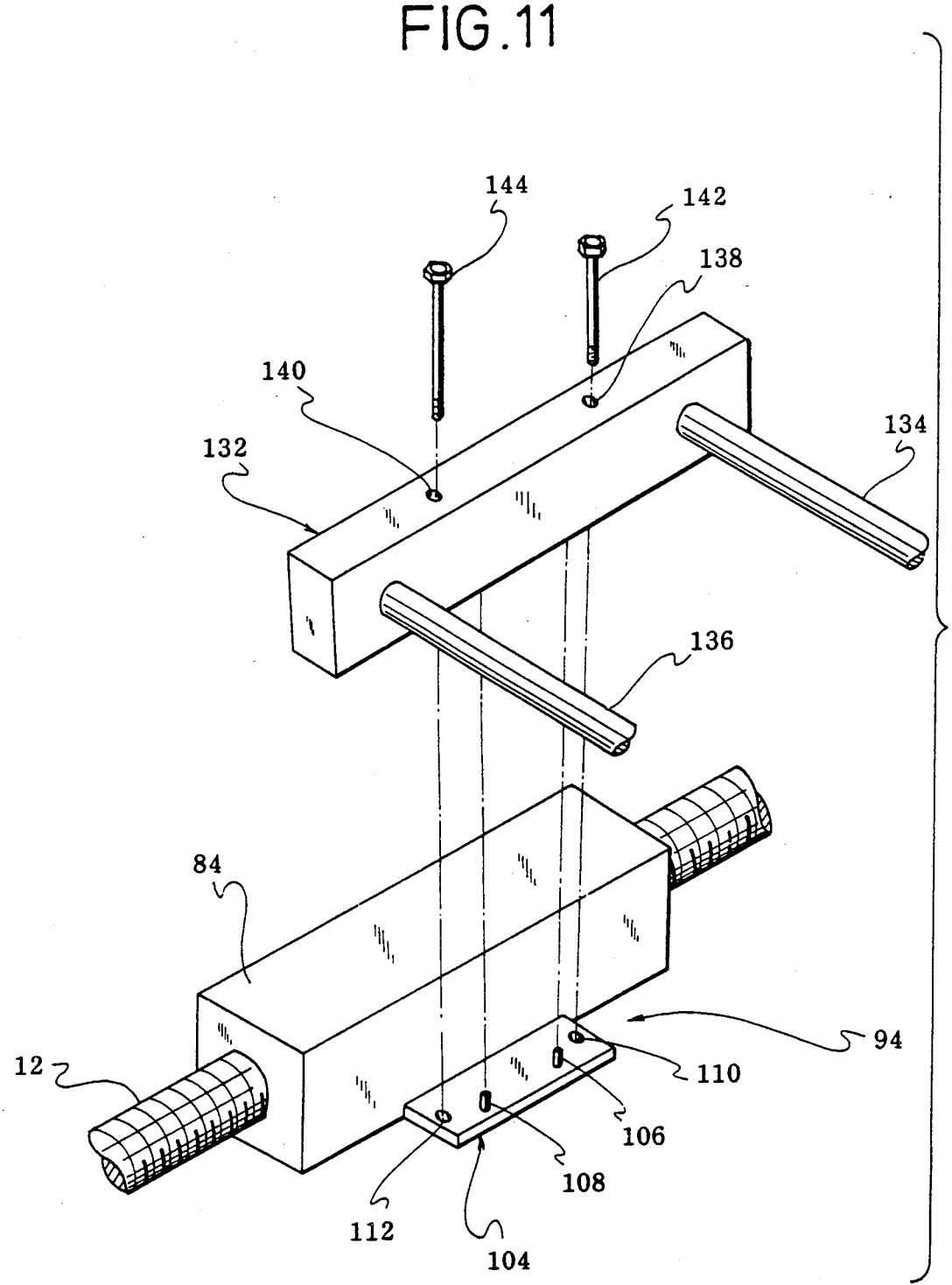
FIG. 11 shows a perspective view of connecting means for sliders shown FIGS. 7-10.

A first rod 312 whose ends are respectively connected to the first traveller 286 or 292 by connecting means 320 and 322 and a second rod 326 whose ends are respectively connected to the second traveller 298 or 304 are passed through a slider 318, so that the slider 318 can move on the first rod 321 and the second rod 326. Note that, it is obvious to persons skilled in the art that sliders shown in FIGS. 3–10 and 12 can be adapted besides one shown in FIG. 14 to the drive system of the second embodiment and connecting means shown in FIGS. 2 and 11 are also able to be adapted thereto.

Next, the action of the drive system of the second embodiment will now be explained.

When the first motor 216 is driven, the shaft 218 and the pulleys 208 and 214 are rotated, so that the timing belts 206 and 212 are driven in the direction of the X-axis. With the movement of the timing belts 206 and 212, the first travellers 286 and 292 are travelled in the direction of the X-axis. When the second motor 262 is driven, the shaft 264 and the pulleys 252 and 258 are rotated, so that the timing belts 250 and 256 are driven in the direction of the Y-axis. With the movement of the timing belts 250 and 256, the second travellers 298 and 304 move in the direction of the Y-axis. The mode of defining the position of the slider 318 in a plane with the movement of the first travellers 286 and 292 and the second travellers 298 and 304 is the same as the first embodiment, so the explanation is omitted. And the control of the first motor 216 and the second motor 262 is executed by a control unit (not shown) with a built-in micro computer.

In the second embodiment, too, two synchronous motors can be adapted as the first drive means or the second drive means. A slider with a rotor driven by third drive means (see FIGS. 12 and 13) is also adapted to the drive system of the second embodiment in the same manner as the first embodiment.

In the two dimensional drive system of the present invention, the load applied to the first drive means and the second drive means can be same, so the torque of the both drive means can be same. Therefore, the slider can be stably moved in the first and the second direction. The drive system is especially effective to move the slider at high speed.

The present invention is not limited to the above stated embodiments and modifications can be allowed without deviating from the scope of the invention.

What is claimed is:

1. A two dimensional drive system comprising:
   a pair of first guide means provided in parallel;
   a pair of second guide means provided in parallel and perpendicular to said first guide means;
   a pair of first travellers movably provided on said first guide means, said first travellers being movable in a first direction along said first guide means;
   a pair of second travellers movably provided on said second guide means, said second travellers being movable in a second direction perpendicular to the first direction along said second guide means;
   at least one first rod having both ends, respectively, connected to said first travellers provided in parallel to said second guide means;
   at least one second rod having both ends, respectively, connected to said second travellers provided in parallel to said first guide means;
   a slider movably provided on said at least one first rod and said at least one second rod, said slider being of a predetermined shape with a central opening therethrough, said central opening having a perimeter being spaced a predetermined distance from at least two edge surfaces of said slider with portions of said slider being disposed between said perimeter of said central opening and said at least two edge surfaces, said at least one first rod and said at least one second rod pass through said portions of said slider disposed between said perimeter of said central opening and said at least two edge surfaces;
   first drive means for synchronously moving said first travellers in the first direction; and
   second drive means for synchronously moving said second travellers in the second direction.

2. A two dimensional drive system according to claim 1, wherein said at least one first rod and said at least one second rod are connected, respectively, to prescribed positions on said first travellers and said second travellers by detachable connecting means.

3. A two dimensional drive system according to claim 1, wherein a rotor which can be rotated and third drive means which rotates said rotor are provided in said slider, said rotor being formed with a hollow center defined by a hole extending therethrough.

4. A two dimensional drive system according to claim 1, wherein said first guide means are a pair of first ball bearing screws on which said first travellers are respectively screwed, said second guide means are a pair of second ball bearing screws on which said second travellers are respectively screwed, said first drive means is one or a plurality of first motors which rotate said first ball bearing screws in the same direction at the same speed, said second drive means is one or a plurality of second motors which rotate said second ball bearing screws in the same direction at the same speed.

5. A two dimensional drive system according to claim 4, wherein said first motor is a single motor which directly rotates said one of said first ball bearing screws and rotates the other with a first transmitter, said second motor is a single motor which directly rotates one of said second ball bearing screws and rotates the other with a second transmitter.

6. A two dimensional drive system according to claim 5, wherein said first transmitter is a first shaft provided between said first motor and said other first ball bearing screw, said first shaft transmits the torque of said first motor with bevel gears which are provided at both end sections of said second shaft, said second transmitter is a second shaft provided between said second motor and said other second ball bearing screw, said second shaft transmits the torque of said second motor with bevel gears which are provided at both end sections of said second shaft.

7. A two dimensional drive system according to claim 4, wherein said at least one first rod and said at least one second rod are connected, respectively, to prescribed positions on said first travellers and said second travellers by detachable connecting means.

8. A two dimensional drive system according to claim 4, wherein a rotor which can be rotated and third drive means which rotates said rotor are provided in said slider.

9. A two dimensional drive system according to claim 8, wherein said rotor is formed with a hollow center defined by a hole extending therethrough.

10. A two dimensional drive system according to claim 1, wherein said first guide means are a pair of first belt drive mechanisms to which said first travellers are attached, said second guide means are a pair of second belt drive mechanisms to which said second travellers are attached, said first drive means is one or a plurality of first motors which drive said first belt drive mechanisms in the same direction at the same speed, said second drive means is one or a plurality of second motors which drive said second belt drive mechanisms in the same direction at the same speed.

11. A two dimensional drive system according to claim 10, wherein said first belt drive mechanisms respectively include a pair of first linear guides to which said first travellers are slidably attached, said second belt drive mechanisms respectively include a pair of second linear guides to which said second travellers are slidably attached.

12. A two dimensional drive system according to claim 10, wherein said at least one first rod and said at least one second rod are connected, respectively, to prescribed positions on said first travellers and said second travellers by detachable connecting means.

13. A two dimensional drive system according to claim 10, wherein a rotor which can be rotated and third drive means which rotates said rotor are provided in said slider.

14. A two dimensional drive system according to claim 13, wherein said rotor is formed with a hollow center defined by a hole extending therethrough.

15. A two dimensional drive system comprising:
a pair of first ball bearing screws provided in parallel;
a pair of second ball bearing screws provided in parallel and perpendicular to said first ball bearing screws;
a pair of first travellers screwed onto said first ball bearing screws, said first travellers being movable in a first direction along said first ball bearing screws;
a pair of second travellers screwed onto said second ball bearing screws, said second travellers being movable in a second direction perpendicular to the first direction along said second ball bearing screws;
at least one first rod having both ends, respectively, connected to said first travellers provided in parallel to said second ball bearing screws;
at least one second rod having both ends, respectively, connected to said second travellers provided in parallel to said first ball bearing screws;
a slider movably provided on said at least one first rod and said at least one second rod, said slider being of a predetermined shape with a central opening therethrough, said central opening having a perimeter being spaced a predetermined distance from at least two edge surfaces of said slider with portions of said slider being disposed between said perimeter of said central opening and said at least two edge surfaces, said at least one first rod and said at least one second rod pass through said portions of said slider disposed between said perimeter of said central opening and said at least two edge surfaces;
a first motor which rotates said first ball bearing screws in the same direction at the same speed, said first motor directly rotating one of said first ball bearing screws and rotating the other of said first ball bearing screws through a first shaft provided between said one first ball bearing screw and said other first ball bearing screw at the ends of said first ball bearing screws which are located closest to said first motor, said first shaft transmitting the torque of said first motor with bevel gears which are provided at both end sections of said first shaft; and
a second motor which rotates said second ball bearing screws in the same direction at the same speed, said second motor directly rotating one of said second ball bearing screws and rotating the other of said second ball bearing screws through a second shaft provided between said one second ball bearing screw and said other second ball bearing screw at the ends of said second ball bearing screws which are located closest to said second motor, said second shaft transmitting the torque of said second motor with bevel gears which are provided at both end sections of said second shaft.

16. A two dimensional drive system according to claim 15, wherein said at least one first rod and said at least one second rod are connected respectively to prescribed positions on said first travellers and said second travellers by detachable connecting means.

17. A two dimensional drive system comprising:
a pair of first belt drive mechanisms provided in parallel, said first belt drive mechanisms respectively including a pair of first linear guides;
a pair of second belt drive mechanisms provided in parallel and perpendicular to said first belt drive mechanisms, said second belt drive mechanisms respectively including a pair of second linear guides;
a pair of first travellers attached to said first belt drive mechanisms, said first travellers being slidably attached to said first linear guides and being movable in a first direction along said first belt drive mechanisms;
a pair of second travellers attached to said second belt drive mechanisms, said second travellers being slidably attached to said first linear guides and being movable in a second direction perpendicular to the first direction along said second belt drive mechanisms;
at least one first rod having both ends, respectively, connected to said first travellers provided in parallel to said second belt drive mechanisms;
at least one second rod having both ends, respectively, connected to said second travellers provided in parallel to said first belt drive mechanisms;

a slider movably provided on said at least one first rod and said at least one second rod, said slider being of a predetermined shape with a central opening therethrough, said central opening having a perimeter being spaced a predetermined distance from at least two edge surfaces of said slider with portions of said slider being disposed between said perimeter of said central opening and said at least two edge surfaces, said at least one first rod and said at least one second rod pass through said portions of said slider disposed between said perimeter of said central opening and said at least two edge surfaces;

one or a plurality of first motors which drive said first belt drive mechanisms in the same direction at the same speed; and one or a plurality of second motors which drive said second belt drive mechanisms in the same direction at the same speed.

18. A two dimensional drive system according to claim 17, wherein said at least one first rod and said at least one second rod are connected, respectively, to prescribed positions on said first travellers and said second travellers by detachable connecting means.

* * * * *